(12) United States Patent
Zhou et al.

(10) Patent No.: US 12,547,059 B2
(45) Date of Patent: Feb. 10, 2026

(54) PHOTOGRAPHY KIT

(71) Applicant: SHENZHEN LEQI INNOVATION CO., LTD., Shenzhen (CN)

(72) Inventors: Feng Zhou, Shenzhen (CN); Tao Jiang, Shenzhen (CN); Keman Yan, Shenzhen (CN); Juan Tan, Shenzhen (CN); Feng Qin, Shenzhen (CN); Kangyao Huang, Shenzhen (CN)

(73) Assignee: SHENZHEN LEQI INNOVATION CO., LTD., Shenzhen (CN)

( * ) Notice: Subject to any disclaimer, the term of this patent is extended or adjusted under 35 U.S.C. 154(b) by 50 days.

(21) Appl. No.: 18/505,115

(22) Filed: Nov. 9, 2023

(65) Prior Publication Data

US 2024/0411212 A1  Dec. 12, 2024

(30) Foreign Application Priority Data

Jun. 7, 2023  (CN) .......................... 202321432038.7

(51) Int. Cl.
*G03B 17/56* (2021.01)
*F16M 11/24* (2006.01)

(52) U.S. Cl.
CPC ......... *G03B 17/566* (2013.01); *F16M 11/245* (2013.01); *F16M 2200/02* (2013.01); *F16M 2200/08* (2013.01)

(58) Field of Classification Search
CPC .. G03B 17/566; G03B 17/561; F16M 11/245; F16M 2200/02; F16M 2200/08; F16M 11/041; F16M 13/00; H04B 1/3888
See application file for complete search history.

(56) References Cited

U.S. PATENT DOCUMENTS

| | | | | |
|---|---|---|---|---|
| 10,932,601 | B1* | 3/2021 | Fan | F16M 13/02 |
| 2009/0308993 | A1* | 12/2009 | Chang | F16B 47/00 |
| | | | | 248/176.3 |
| 2013/0005401 | A1 | 1/2013 | Rosenhan | |
| 2015/0191124 | A1* | 7/2015 | Du | F16M 13/022 |
| | | | | 248/205.5 |
| 2016/0288730 | A1* | 10/2016 | Lee | B60R 11/02 |
| 2022/0060208 | A1* | 2/2022 | Wang | H04M 1/04 |

FOREIGN PATENT DOCUMENTS

| | | | | |
|---|---|---|---|---|
| CN | 114198373 | A * | 3/2022 | F16B 2/10 |
| CN | 216408348 | U | 4/2022 | |
| GB | 2528118 | A | 1/2016 | |

* cited by examiner

*Primary Examiner* — Abdelaaziz Tissire

(57) ABSTRACT

A photography kit is provided, which includes a first photography assembly including a first frame and a clamping assembly including two clamping bodies, a mounting seat, and a first locking assembly. The two clamping bodies are rotatably arranged on two opposite sides of the mounting seat. A connecting part is protruded at outside surfaces of the clamping bodies respectively. An end of the connecting part away from the clamping body is connected with a pressing part, which extends towards a rear end of the mounting seat, so that a pressing space is formed between the pressing part and the mounting seat. The first locking assembly is telescopically mounted to the mounting seat, a limiting part of the first locking assembly extends from the front end of the mounting seat, and the limiting part is configured for being inserted into a positioning hole correspondingly defined on the first frame.

13 Claims, 4 Drawing Sheets

PHOTOGRAPHY KIT

TECHNICAL FIELD

The present disclosure relates to the technical field of photography equipment, and in particular to a photography kit.

BACKGROUND

With improvement of living standards, photography has become an important part of people's life, and requirements for photographing experience are increasingly getting higher. Many photography assemblies are required to assemble a variety of electronic devices so as to assist in shooting. The photography assemblies can be a camera protective frame, a monitor protective frame, a side handle, an upper hand-held, a shouldering system, etc., and the electronic devices can be a camera, a monitor, a flash, a microphone, a wireless image transmission, etc. For example, the side handle is fixed to the camera protective frame through an interface of a clamp holder photography kit. In related art, the photography device in CN2021231767119 is inconvenient and laborious in operation.

SUMMARY

A main object of the disclosure is to provide a photography kit, which aims to solve a technical problem that it is laborious for two clamping bodies in existing photography kits to clamp or release a frame.

In order to achieve the above object, a photography kit is provided in the disclosure, which includes a first photography assembly and a clamping assembly for clamping and fixing the first photography assembly. The first photography assembly includes a first frame, and the clamping assembly includes two clamping bodies, a mounting seat and a first locking assembly. The two clamping bodies are rotatably arranged on opposite sides of the mounting seat, and heads of the two clamping bodies both extend from a front end of the mounting seat to clamp and fix on two edges of the first frame. A connecting part extending away from a respective clamping body is convexly provided at two outside surfaces of the clamping bodies proximate to tail ends of the clamping bodies respectively. An end of the connecting part away from the clamping body is connected with a pressing part, and the pressing part extends towards a rear end of the mounting seat, so that a pressing space is formed between the pressing part and the mounting seat.

The first locking assembly can be telescopically mounted to the mounting seat, and a limiting part of the first locking assembly can extend from the front end of the mounting seat, and the limiting part is configured for being inserted into a positioning hole correspondingly defined on the first frame.

In some embodiments, a free end of the pressing part extends from the rear end of the mounting seat.

In some embodiments, the rear end of the mounting seat is convexly provided with an external connection part. The external connection part is configured for connecting a second photography assembly. A maximum cross-sectional area of a connection part between the external connection part and the mounting seat is smaller than a surface area of the rear end of the mounting seat, and the external connection part is located between free ends of two pressing parts.

In some embodiments, a plurality of frictional parts are provided outside the pressing part; and/or
an internal thread is provided in the positioning hole.

In some embodiments, the first locking assembly includes at least one abutting member. An end of the at least one abutting member is provided with a limiting part, and the limiting part includes a cylinder, and a width dimension of an end of the cylinder is provided to be tapered.

In some embodiments, the mounting seat further includes at least one elastic member. The at least one elastic member is mounted in the mounting seat, and the at least one elastic member is each configured for driving a respective abutting member so that the limiting part protrudes from the front end of the mounting seat.

In some embodiments, the clamping assembly further includes a positioning rod. The positioning rod is fixedly mounted to the mounting seat and extends along an up-and-down direction of the mounting seat. The abutting member is provided with a sliding hole extending along a front-back direction of the mounting seat, and the positioning rod penetrates through the sliding hole.

In some embodiments, the photography kit further includes a second locking assembly mounted on the mounting seat. The second locking assembly includes at least one support and a second drive member. The at least one support is located between tail parts of the two clamping bodies, and the second drive member is configured for driving the at least one support so that two opposite ends of the at least one support are respectively abutted against the tail parts of the two clamping bodies or separated from the clamping bodies.

In some embodiments, a head of the clamping body is provided with a clamping part protruding towards a side of the mounting seat, and the clamping part is configured for clamping with the first frame, and there is an included angle α between the clamping part and the clamping body, which is more than or equal to 97° and less than or equal to 105°.

In some embodiments, a slot is concavely provided at left and right sides of the first frame respectively, and two clamping parts are respectively inserted into two slots.

In some embodiments, two sides of the slot facing an end face of the first photography assembly are each of an arc surface, and sides of the two clamping parts facing the first frame are flared.

In the photography kit provided in this disclosure, the clamping space is formed by the heads of the two clamping bodies and the front end of the mounting seat, the limiting part of the first locking assembly can extend from the front end of the mounting seat, and the pressing space is formed between the two pressing parts and the two sides of the mounting seat. During assembly, when the user presses the two pressing parts at the same time, the two clamping bodies rotate relative to the mounting seat so that a distance between the heads of the two clamping bodies gradually increases, and during extending of the first frame into the clamping space, the limiting part is inserted into the positioning hole, and after the two clamping bodies are released, the heads of the two clamping bodies are respectively clamped and fixed on the two edges of the first frame, and the first locking assembly abuts against the first photography assembly, so that a bearing force is created between the mounting seat and the first photography assembly, and thus the two clamping bodies can stably clamp the first photography assembly, which is labor-saving in operation and improves user experience. During disassembly, the two clamping bodies are pressed again to rotate relative to the mounting seat, so that the heads of the two clamping bodies release the first frame, the first photography assembly is separated from the mounting seat, and the first locking assembly is restored to an original position, which is simple in operation and improves photographing experience of users.

REFERENCE NUMBERS ARE ILLUSTRATED AS FOLLOWS

Figure 1:
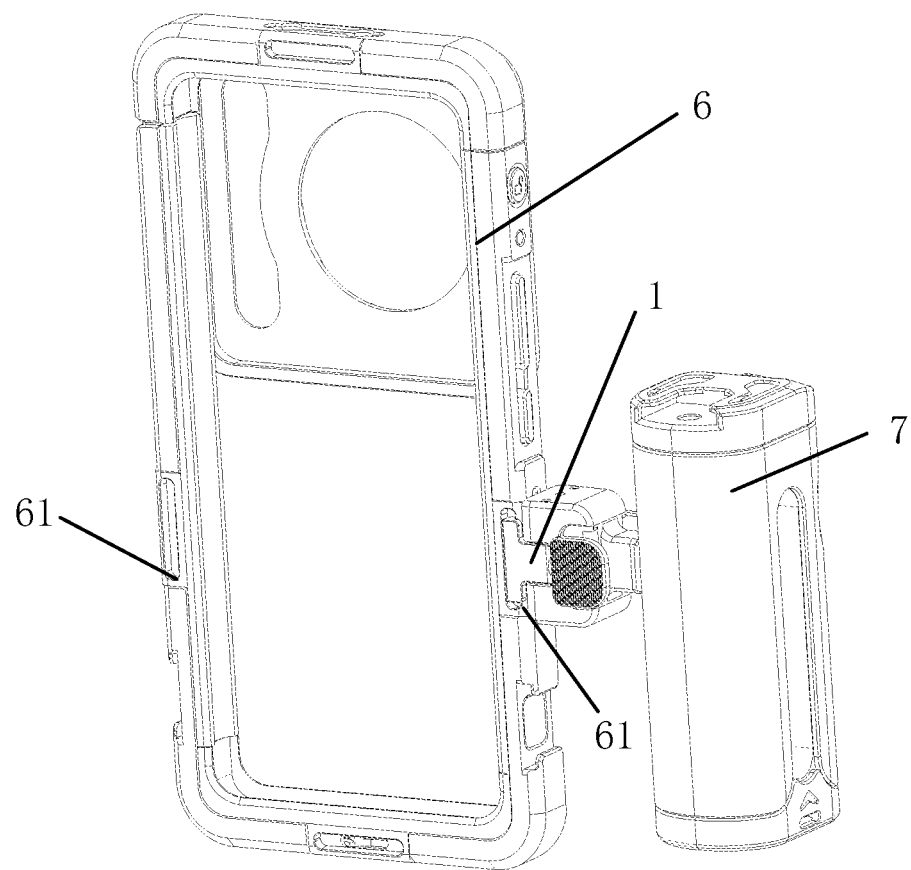
FIG. 1 is a schematic structural diagram of a photography kit in a use state according to an embodiment of the present disclosure.

Clamping Body 1; Clamping Assembly 10; Clamping Part 11; Connecting Part 12; Pressing Part 13; Frictional Part 131; Connecting Shaft 14;
Mounting Seat 2; External Connection Part 21; Mounting Hole 22; Mounting space 23;
First Locking Assembly 30; Abutting Member 31; Limiting Part 310; Cylinder 311; Sliding Hole 312; Elastic Member 32;
Positioning rod 51;
First photography assembly 6; First Frame 61; Positioning Hole 62; Internal Thread 621; Slot 63;
Second photography assembly 7.

Realization of the object, functional characteristics and advantages of the disclosure will be further explained in combination with embodiments and with reference to attached figures.

DETAILED DESCRIPTION OF THE EMBODIMENTS

In the following, the technical schemes in the embodiments of the disclosure will be described clearly and completely in connection with the drawings; obviously, the described embodiment is intended to be only a part of the embodiment of the disclosure, but not all of them. On a basis of the embodiments in this disclosure, all other embodiments obtained by the ordinary skilled in the art without any creative effort fall within the protection scope of this disclosure.

It should be noted that all of directional indications (such as up, down, left, right, front, back, etc.) in embodiments of the disclosure are only used to illustrate relative position relationships and movement conditions among respective components in a certain posture (as shown). If the certain posture changes, the directional indications vary accordingly.

It should also be noted that when an element is referred to be "fixed" or "provided" on another element, it may be directly on the another element or an intervening element may exist at the same time. When an element is referred to be "connected" to another element, it may be directly connected to the another element or an intervening element may exist at the same time.

In addition, descriptions involving "first", "second" or the like in this disclosure are only intended for descriptive purposes, and cannot be understood as indicating or implying a relative importance, or implicitly indicating a number of indicated technical features. Therefore, the features defined with "first" and "second" can explicitly or implicitly include at least one of these features. In addition, technical schemes of respective embodiments can be combined with each other, which must be based on enabling of realization by an ordinary skilled in the art. When combination of technical schemes is contradictory or impossible to be realized, it should be considered that such combination of technical schemes does not exist and either is not within the protection scope claimed in this disclosure.

A photography kit is provided in an embodiment of the disclosure, which, referring to FIG. 1, FIG. 2, FIG. 5, and FIG. 6, includes a first photography assembly 6 and a clamping assembly 10 for clamping and fixing the first photography assembly 6. The first photography assembly 6 includes a first frame 61, and the clamping assembly 10 includes two clamping bodies 1, a mounting seat 2, and a first locking assembly 30. The two clamping bodies 1 are rotatably arranged on opposite sides of the mounting seat 2, and heads of the two clamping bodies 1 both extend from a front end of the mounting seat 2 to clamp and fix on two edges of the first frame 61. A connecting part 12 extending away from a respective clamping body is protruded at two outside surfaces of the clamping bodies 1 proximate to their tail ends respectively. An end of the connecting part 12 away from the clamping body 1 is connected with a pressing part 13, and the pressing part 13 extends towards a rear end of the mounting seat 2, so that a pressing space is formed between the pressing part 13 and the mounting seat 2. The clamping body 1 is rotatably connected to the mounting base 2 through a connecting shaft 14, the clamping body 1 is applied with the lever principle, the pressing part 13 prolongs a force arm to save labor, the pressing space increases an opening angle of the clamping body 1, and a volume of the mounting seat 2 is reduced by using the connecting part 12.

The first locking assembly 30 can be telescopically mounted to the mounting seat 2. A limiting part 310 of the first locking assembly 30 can extend from the front end of the mounting seat, and the limiting part 310 is configured for being inserted into a positioning hole 62 correspondingly defined in the first frame 61.

In this embodiment, a clamping space is formed by the heads of the two clamping bodies 1 and the front end of the mounting seat 2 for clamping the first frame 61, the limiting part 310 of the first locking assembly 30 can extend from the front end of the mounting seat 2, and a pressing space is formed between the two pressing parts 13 and the two sides of the mounting seat 2. During assembly, when user presses the two pressing parts 13 at the same time, the two clamping bodies 1 rotate relative to the mounting seat 2 so that a distance between the heads of the two clamping bodies 1 gradually increases, and during extending of the first frame 61 into the clamping space, two limiting parts 310 are respectively inserted into two positioning holes 62, and after the two clamping bodies 1 are released, the heads of the two clamping bodies 1 are respectively clamped and fixed on the two edges of the first frame 61, and the first locking assembly 30 abuts against the first photography assembly 6, so that a bearing force is created between the mounting seat 2 and the first photography assembly 6, and thus the two clamping bodies 1 can stably clamp the first photography assembly 6, which is labor-saving in operation and improves user experience. During disassembly, the two clamping bodies 1 are pressed again to rotate relative to the mounting seat 2, so that the heads of the two clamping bodies 1 release the first frame 61, the first photography assembly 6 is separated from the mounting seat 2, and the first locking assembly 30 is restored to an original position, which is simple in operation and improves photographing experience of users.

Figure 7:
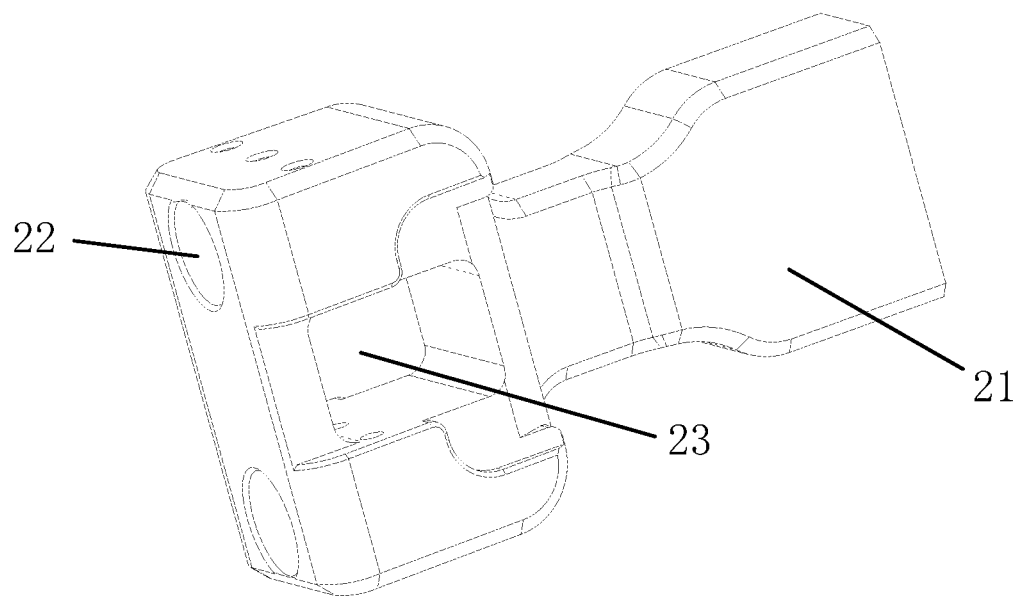
FIG. 7 is a schematic structural diagram of a mounting seat of the clamping assembly according to the present disclosure.

The first locking assembly 30 can be located between the two clamping bodies 1, so that an overall structure is compact, with a small occupied space. The pressing part 13 and the clamping body 1 may be arranged in parallel, and both the pressing part 1 and the clamping body 1 may be sheet-shaped, and the head of the clamping body 1 is configured for clamping and fixing the first frame 61 of the first photography assembly 6. For example, an internal side of the head of the clamping body 1 may have a frictional part 131 for clamping the first photography assembly 6, so that the head of the clamping body 1 can be inserted and matched or clamped with the first photography assembly 6. The clamping body 1 may be rotatably connected with the mounting seat 2 through a torsion spring and a connecting shaft 14, and a middle region of the clamping body 1 may be provided with a through hole to be rotatably connected with the connecting shaft 14. For example, each of the clamping bodies 1 can be rotatably connected with the mounting seat 2 through a respective torsion spring and a respective connecting shaft 14, and the two clamping bodies 1 can also be rotatably connected through a torsion spring. Of course, a compression spring can also be provided between the two clamping bodies 1, and the compression spring may be sleeved on a limit rod. The front end of the mounting seat 2 may be matched with the first frame 61 of the first photography assembly 6 in shape. For example, an outer surface of the first frame 61 of the first photography assembly 6 opposite to the front end of the mounting seat 2 may be a flat surface, and a surface of the front end of the mounting seat 2 may be a flat surface. As shown in FIG. 7, the mounting seat 2 may correspondingly form mounting sites of grooves and holes for mounting various components. A mounting space 23 penetrates through the mounting seat 2 in a left-right direction, and the two clamping bodies 1 cover two sides of an opening of the mounting space 23 for mounting the torsion spring, the compression spring, or the limiting rod. A mounting hole 22 is configured to penetrate through the front end of the mounting seat 2, and the mounting hole 22 is configured to be communicated with the mounting space 23. The abutting member 31 is slidably accommodated in the mounting hole 22, and the cylinder 311 extends outside the mounting hole 22.

In order to press the pressing part 13 with saved labor and a large pressing space, the free end of the pressing part 13 extends from the rear end of the mounting seat 2, which also reduces a thickness of the mounting seat 2 between the two clamping bodies 1. In order to facilitate pressing, a plurality of frictional parts 131 can be formed as textures, and the frictional parts 131 can also be arranged in a convex or dot shape, and of course, they can also be in other shapes, such as tire treads.

The mounting seat 2 is further connected with the second photography assembly 7, so as to realize fixed connection between the first photography assembly 6 and the second photography assembly 7. In some embodiments, an external connection part 21 is protruded on the rear end of the mounting seat 2 for connecting the second photography assembly 7. A maximum cross-sectional area of a connecting part between the external connection part 21 and the mounting seat 2 is smaller than a surface area of the rear end of the mounting seat 2, and the external connection part 21 is located between free ends of the two pressing parts 13 so as to form a pressing space cooperatively with the pressing parts 13. The mounting seat 2 and the external connection part 21 can be integrally or separately arranged.

Figure 3:
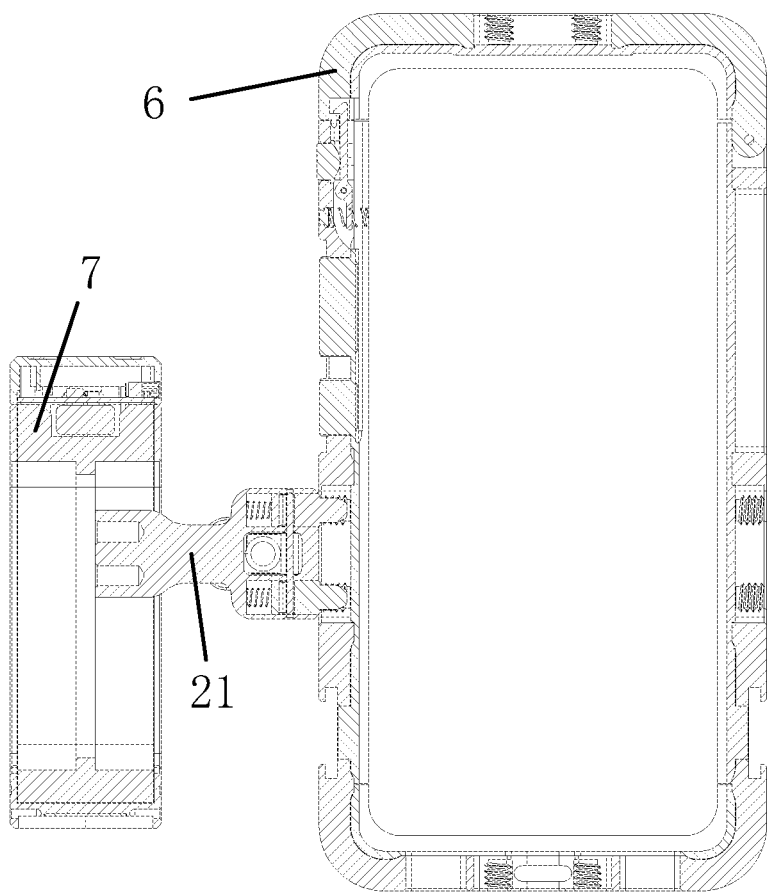
FIG. 3 is a sectional view of the photography kit in FIG. 1.
Figure 5:
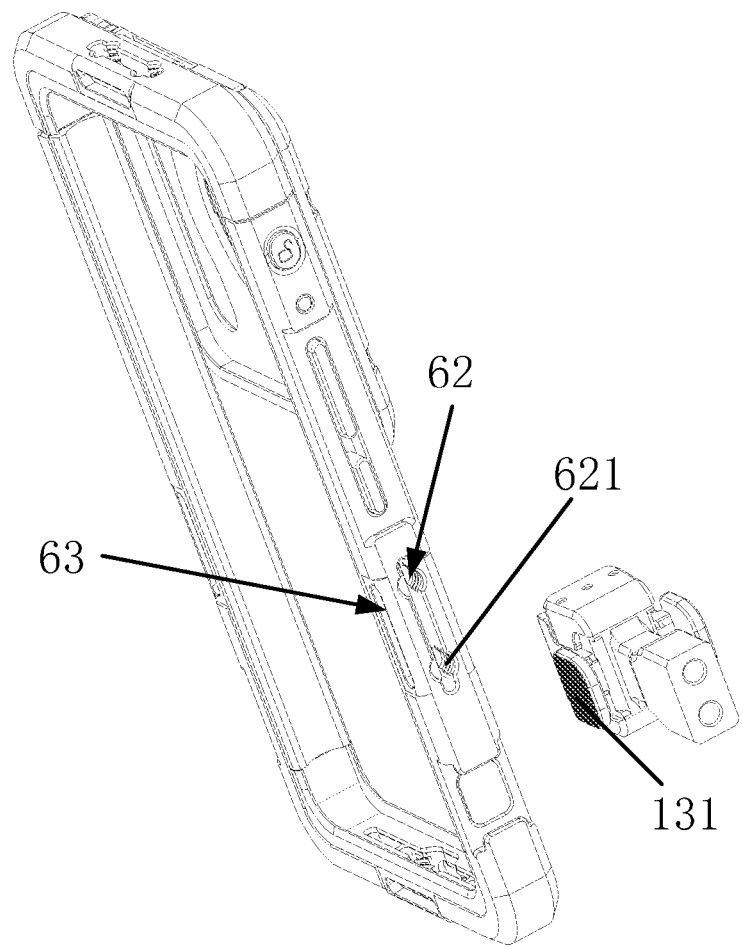
FIG. 5 is a schematic structural diagram in which the clamping assembly and a first photography assembly are separated according to the present disclosure.

As shown in FIGS. 3 and 5, further, the first locking assembly 30 includes at least one abutting member 31, and an end of the abutting member 31 is provided with a limiting part 310, and the limiting part 310 includes a cylinder 311. A cross-sectional area of the cylinder 311 is smaller than a cross-sectional area of a connecting part between the abutting member 31 and the cylinder 311, and a width of an end of the cylinder 311 is tapered to facilitate rapid and accurate insertion into the positioning hole 62. For example, the free end of the cylinder 311 is in a form of a cone. An internal thread 621 is provided in the positioning hole, and when the first frame 61 is not connected with the clamping assembly 10, the positioning hole 62 may be connected with other photography assembly or accessories, thereby increasing use function of the first photography assembly 6.

Both the first photography assembly 6 and the second photography assembly 7 may be accessories for assisting in shooting by electronic devices. The first photography assembly 6 may be a camera protection frame, an L-plate, an adapter plate, etc., and the second photography assembly 7 may be a side handle, an upper hand-held, a microphone stand, etc. For example, the first photography assembly 6 is a cage (an electronic device such as a mobile phone, a stabilizer, a camera, etc.), which is also called a rabbit cage, a protective frame, etc. The cage may be half packaged or fully packaged. For example, the cage includes four frames connected in sequence, each including one or more first frames. By way of example, left and right frames are respectively provided with the first frame 61. In order to make the connection more stable, a limiting groove may be formed at an opening of the positioning hole 62, and a connecting part between the abutting member 31 and the limiting part 310 may be limited in the limiting groove.

In some embodiments, the mounting seat 2 further includes at least one elastic member 32 mounted in the mounting seat 2, and the at least one elastic member 32 is each configured for driving a respective abutting member 31 to allow the limiting part 310 to protrude from the front end of the mounting seat 2. The elastic member 32 may be a spring, and the spring is compressed or extended to realize movement of the limiting part 310 of the abutting member 31 extending from the front end of the mounting seat 2 in a front-back direction of the mounting seat 2. One or more than one spring can simultaneously drive two abutting members by a plate body to ensure synchronization. The spring is mounted in the mounting base 2, an end of the abutting member 31 is connected with the spring, and the limiting part 310 is capable of extending from the front end of the mounting seat 2.

In this embodiment, the abutting member 31 may be in a form of any one of a cylindrical shape, a rod, a block, or a ball. When the first frame 61 of the first photography assembly 6 extends into the clamping space, the limiting part 310 of the abutting member 31 extends from the front end of the mounting seat 2, and both sides of the first frame 61 of the first photography assembly 6 push the cylinder 311 of the abutting member 31 to move towards the mounting seat 2. After the two clamping bodies 1 are released, the heads of the two clamping bodies 1 are clamped and fixed on both sides of the first frame 61 of the first photography assembly 6, so that the spring is compressed between the mounting seat 2 and the first frame 61, and thus a bearing force is created between the mounting seat 2 and the first frame 61, so that the two clamping bodies 1 can stably clamp the first photography assembly 6 and the two clamping bodies 1 can be prevented from shaking relative to the first photography assembly 6 during use. During disassembly, the first frame 61 is separated from the mounting seat 2, and the elastic member 32 drives the abutting member 31 to return to its original position, which is with a simple structure and is convenient to produce and assemble. There may be one abutting member 31, there may be two abutting members 31 arranged at intervals in parallel, or there may be more than two abutting members provided according to use requirements, which will not be set one by one here. Of course, an elastic pad, which can be a sponge pad or a silica gel pad, is attached to the front end of the mounting seat 2 or a surface of the first frame 61.

Figure 4:
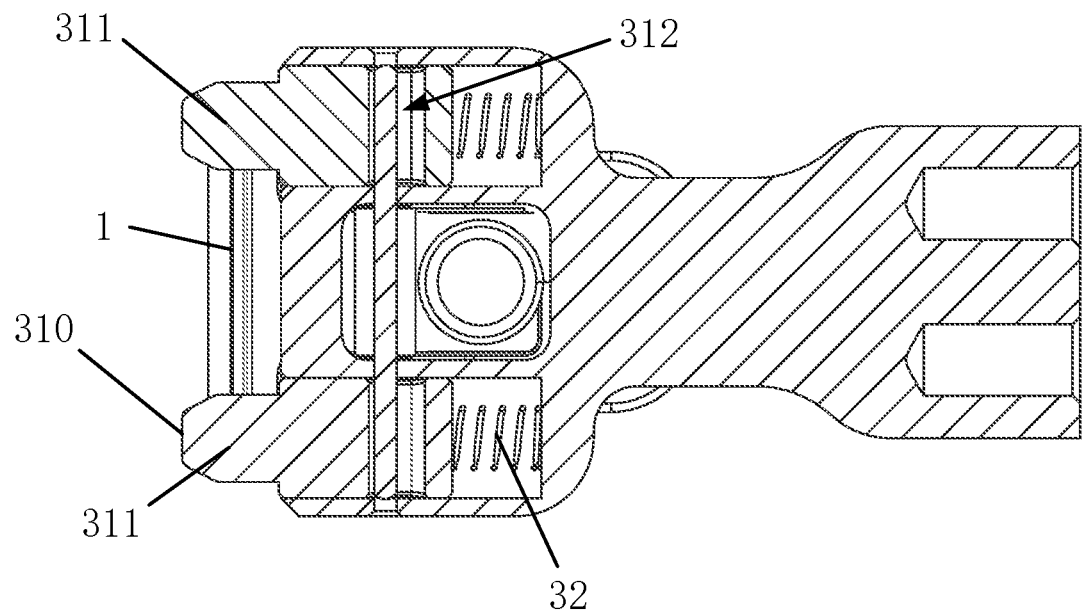
FIG. 4 is a sectional view of the clamping assembly of the photography kit according to the present disclosure.
Figure 6:
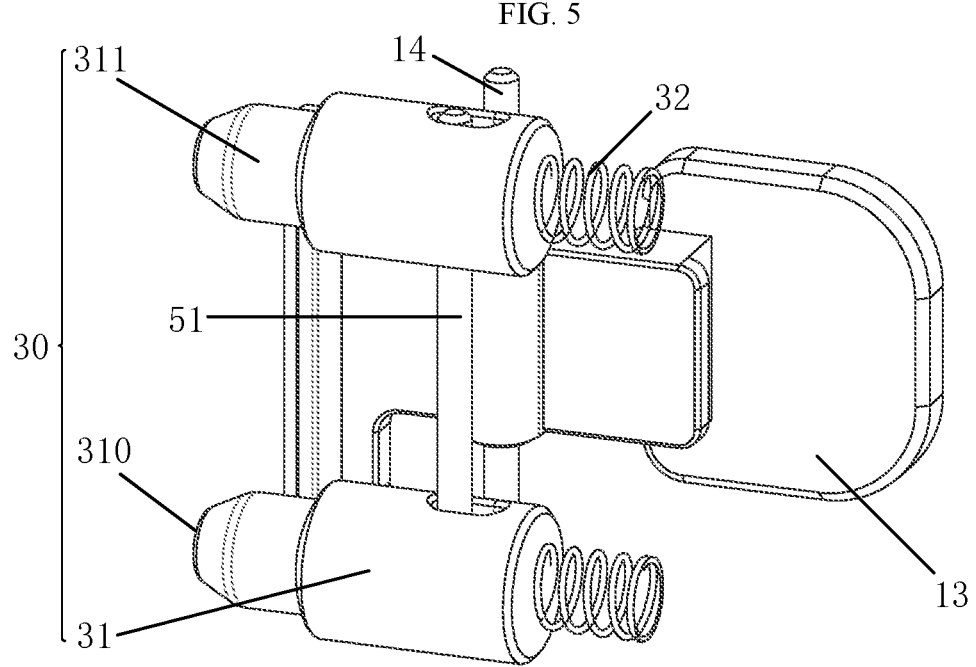
FIG. 6 is a partial schematic structural diagram of the clamping assembly according to the present disclosure.

Referring to FIG. 4 and FIG. 6, the photography kit according to an embodiment of the disclosure further includes a positioning rod 51. The positioning rod 51 is fixedly mounted on the mounting seat 2 and extends in the up-and-down direction of the mounting seat 2, and the abutting member 31 is provided with a sliding hole 312 extending in the front-back direction of the mounting seat 2, and the positioning rod penetrates through the sliding hole 312.

In this embodiment, the positioning rod 51 serves to mount the abutting member 31 on the mounting seat 2, and the sliding hole 312 defines a range of the abutting member 31 moving forward and backward. The spring pushes the abutting member 31 to move forward and backward along the mounting seat 2, and the sliding hole 312 has opposite first and second ends. After assembly, the spring is abutted against the abutting member 31 so that the positioning rod is located at the first end of the sliding hole 312. During assembly, when the first frame 61 of the first photography assembly 6 extends into the clamping space, the limiting part 310 is inserted into the positioning hole 62, and the first frame 61 of the first photography assembly 6 pushes the abutting member 31 to move towards the mounting seat 2, so that the first end of the sliding hole 312 gradually moves away from the positioning rod, and the second end of the sliding hole 312 gradually approaches the positioning rod. During disassembly, the first photography assembly 6 is separated from the mounting seat 2, and the spring drives the abutting member 31 to return to the original position, that is, the first end of the sliding hole 312 gradually approaches and abuts against the positioning rod and the second end of the sliding hole 312 gradually moves away from the positioning rod, which is with a simple structure, reduced overall weight, and convenient production and assembly. Of course, when there are two or more abutting members 31, the two or more abutting members 31 can be sleeved on a same positioning rod, which has a compact overall structure and a small occupied space. It can be understood that the abutting members 31 can also be sleeved on different positioning rods, which is not limited here.

Figure 2:
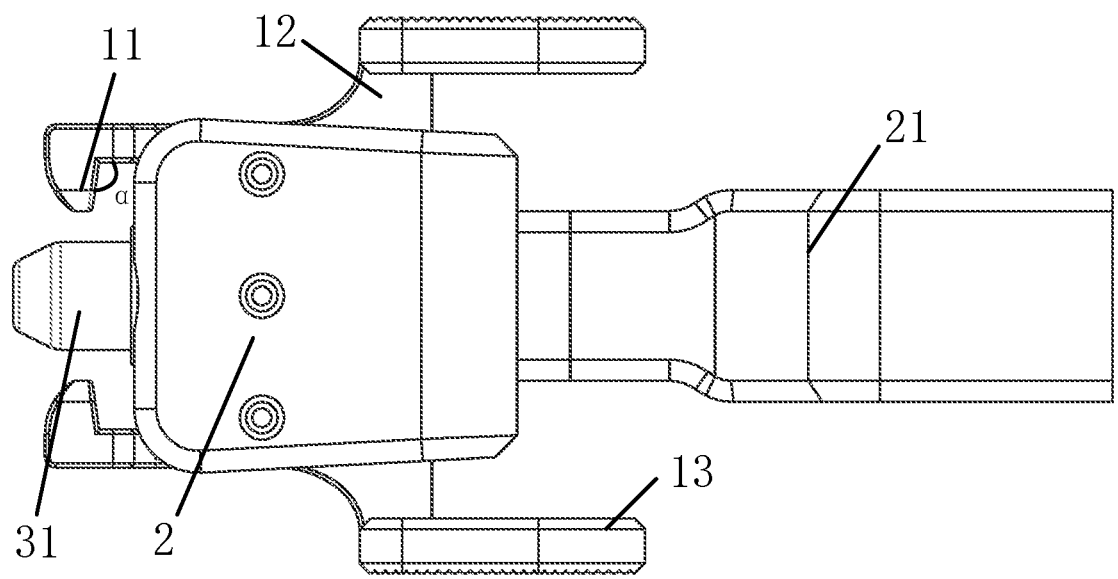
FIG. 2 is a schematic structural diagram of a clamping assembly of a photography kit according to the present disclosure.

Referring to FIG. 2, FIG. 5, and FIG. 6, the head of the clamping body 1 according to the embodiment of the disclosure is provided with a clamping part 11 protruding towards a side of the mounting seat 2, and the clamping part 11 is configured for clamping with the first photography assembly 6. A slot 63 is defined at left and right sides of the first frame 61 respectively, and two clamping parts 11 are respectively inserted into two slots 63. In order to facilitate the first frame 61 to slide into the clamping space, both sides of the first frame 61 of the first photography assembly 6 can be each of an arc surface, an outer surface of the first frame 61 of the first photography assembly 6 can be a flat surface, and sides of the two clamping parts 11 facing the first frame 61 are flared.

In this embodiment, the clamping part 11 can prevent the first frame 61 from being separated from the front end of the mounting seat 2, and the slot 63 is defined at both opposite sides of the first frame 61. After assembly, each clamping part 11 is clamped into a respective slot 63, and the abutting member 31 abuts against the first frame 61, so that the clamping part 11 is more closely attached to a rear wall of the slot 63.

Referring to FIG. 2, FIG. 6, and FIG. 7, there is an included angle α between the clamping part 11 and the clamping body 1 according to the disclosure, which is more than or equal to 97° and less than or equal to 105°.

In this embodiment, in order to make the clamping part 11 be attacked to the first frame 61 more closely and reduce clearance, a surface of the clamping part 11 facing the clamping body 1 is an inclined surface, and there is an included angle α between the clamping part 11 and the clamping body 1, and the first frame 61 is correspondingly provided with an inclined surface matching with the clamping part 11, which facilitates assembly of the first frame 61.

To sum up, the photography kit includes two abutting members 31, and the two clamping bodies 1 can be rotatably connected with the mounting seat 2. After assembly, the cylinder 311 of the abutting member 31 extends from the front end of the mounting seat 2, and the two clamping bodies 1 are arranged on opposite sides of the mounting seat 2 in parallel, and the external connection part 21 of the rear end of the mounting seat 2 is connected with the second photography assembly. During a process of mounting the first photography assembly 6 on the photography kit, the pressing parts 13 at tails of the two clamping bodies 1 are pressed, so that the tails of the two clamping bodies 1 compress the torsion spring arranged therebetween, and the heads of the two clamp bodies 1 are opened, and arc surfaces of the two sides of the first frame 61 gradually slide between the heads of the opened clamping bodies 1 along the arc surfaces of the two clamping parts 11, and at the same time, the two positioning holes 62 of the first frame 61 are respectively aligned with the limiting parts 31 of the two abutting members 31, so that the cone at the free end of the cylinder 311 gradually extends into the positioning hole 62 until a part of the abutting member 31 abuts against the positioning groove at the opening of the positioning hole 61, the spring connected with an end of the abutting member 31 away from the limiting part 310 is compressed, the two pressing parts 13 are released, and the clamping parts 11 of the two clamping bodies 1 are respectively clamped into the slots 63 at both sides of the first frame 61, thereby realizing the fixed connection of the first photography assembly 6 and the second photography assembly 7.

In unlocking, the pressing parts 13 at the tails of the two clamping bodies 1 are pressed again to make the free ends of the pressing parts 13 close to each other, so that the tails of the two clamping bodies 1 compress the torsion spring arranged therebetween and the heads of the two clamping bodies 1 are opened, and at the same time, the two clamping parts 11 are decoupled from the two slots 63, so that the first frame 61 is gradually removed from the front end of the mounting seat 2 between the heads of the two opened clamping bodies 1, and at the same time, the limiting parts 310 of the two abutting members 31 are gradually detached from the positioning holes 62, thus separating the first photography assembly 6 from the clamping assembly 10.

The above are only some embodiments of the present disclosure, and neither the words nor the drawings can limit the protection scope of the present disclosure. Any equivalent structural transformation made by using the contents of the specification and the drawings of the present disclosure under the overall concept of the present disclosure, or directly/indirectly applied in other related technical fields are included in the protection scope of the present disclosure.

What is claimed is:

1. A photography kit, comprising a first photography assembly and a clamping assembly for clamping and fixing the first photography assembly, wherein the first photography assembly comprises a first frame, and the clamping assembly comprises two clamping bodies, a mounting seat, and a first locking assembly, the two clamping bodies being rotatably arranged on opposite sides of the mounting seat, and heads of the two clamping bodies both extending from a front end of the mounting seat to clamp and fix on two edges of the first frame, one of two connecting parts being protruded at an outside surface of a respective clamping body proximate to a tail end of the respective clamping body and extending away from the respective clamping body, an end of each connecting part away from the respective clamping body being connected with one of two pressing parts, and each pressing part of the two pressing parts extending towards a rear end of the mounting seat, allowing a pressing space to be formed between the two pressing parts and the mounting seat; and the first locking assembly being telescopically mounted to the mounting seat, a limiting part of the first locking assembly being capable of extending from the front end of the mounting seat, and the limiting part being configured to be inserted into a positioning hole correspondingly defined on the first frame.

2. The photography kit according to claim 1, wherein a free end of each pressing part extends from the rear end of the mounting seat.

3. The photography kit according to claim 2, wherein an external connection part is protruded on the rear end of the mounting seat, the external connection part is configured to connect a second photography assembly, a maximum cross-sectional area of a connection part between the external connection part and the mounting seat is smaller than a surface area of the rear end of the mounting seat, and the external connection part is located between free ends of the two pressing parts.

4. The photography kit according to claim 3, wherein the first locking assembly includes at least one abutting member, an end of the at least one abutting member is provided with a limiting part, the limiting part comprises a cylinder, a cross-section area of the cylinder is smaller than a cross-section area of a connecting part between the abutting member and the cylinder, and a width dimension of an end of the cylinder is provided to be tapered.

5. The photography kit according to claim 2, wherein the first locking assembly includes at least one abutting member, an end of the at least one abutting member is provided with a limiting part, the limiting part comprises a cylinder, a cross-section area of the cylinder is smaller than a cross-section area of a connecting part between the abutting member and the cylinder, and a width dimension of an end of the cylinder is provided to be tapered.

6. The photography kit according to claim 1, wherein a plurality of frictional parts are provided outside each pressing part; and/or an internal thread is provided in the positioning hole.

7. The photography kit according to claim 6, wherein the first locking assembly includes at least one abutting member, an end of the at least one abutting member is provided with a limiting part, the limiting part comprises a cylinder, a cross-section area of the cylinder is smaller than a cross-section area of a connecting part between the abutting member and the cylinder, and a width dimension of an end of the cylinder is provided to be tapered.

8. The photography kit according to claim 1, wherein the first locking assembly includes at least one abutting member, an end of the at least one abutting member is provided with a limiting part, the limiting part comprises a cylinder, a cross-section area of the cylinder is smaller than a cross-section area of a connecting part between the abutting member and the cylinder, and a width dimension of an end of the cylinder is provided to be tapered.

9. The photography kit according to claim 8, wherein the mounting seat further comprises at least one elastic member, the at least one elastic member is mounted in the mounting seat, and the at least one elastic member is each configured to drive a respective abutting member to allow the limiting part protruding from the front end of the mounting seat.

10. The photography kit according to claim 8, wherein the clamping assembly further comprises a positioning rod, the positioning rod being fixedly mounted to the mounting seat and extending along an up-and-down direction of the mounting seat; and the abutting member is provided with a sliding hole extending along a front-back direction of the mounting seat, the positioning rod penetrating through the sliding hole.

11. The photography kit according to claim 1, wherein a head of the clamping body is provided with a clamping part protruding towards a side of the mounting seat, the clamping part is configured to clamp with the first frame, and there is an included angle α between the clamping part and the clamping body, which is more than or equal to 97° and less than or equal to 105°.

12. The photography kit according to claim 11, wherein a slot is defined at left and right sides of the first frame respectively, and two clamping parts are respectively inserted into two slots.

13. The photography kit according to claim 12, wherein two sides of the slot facing an end face of the first photography assembly are each of an arc surface, and sides of the two clamping parts facing the first frame are flared.

* * * * *